(12) United States Patent
Oguri et al.

(10) Patent No.: US 6,620,488 B2
(45) Date of Patent: Sep. 16, 2003

(54) SKIN MATERIAL, SKINNED CUSHION, AND PROCESS FOR PRODUCING SKINNED CUSHION

(75) Inventors: Tsunenori Oguri, Gifu (JP); Hiroshi Fujii, Aichi (JP); Tsutomu Yano, Aichi (JP)

(73) Assignee: Inoac Corporation, Aichi (JP)

( * ) Notice: Subject to any disclaimer, the term of this patent is extended or adjusted under 35 U.S.C. 154(b) by 0 days.

(21) Appl. No.: 09/788,649

(22) Filed: Feb. 21, 2001

(65) Prior Publication Data

US 2002/0155255 A1 Oct. 24, 2002

(51) Int. Cl.$^7$ ................................................. B32B 27/14
(52) U.S. Cl. ........................ 428/195; 428/198; 428/200; 428/213; 428/220; 156/291; 156/292; 156/295; 156/307.3; 156/308.4; 156/312; 156/325
(58) Field of Search ................................. 428/195, 198, 428/200, 213, 214, 220; 156/278, 283, 290, 291, 292, 295, 307.3, 308.4, 312, 325

(56) References Cited

FOREIGN PATENT DOCUMENTS

| JP | 6-182067 | 7/1994 | ............ B68G/7/05 |
| JP | 7-195600 | 8/1995 | ............ B32B/5/18 |

*Primary Examiner*—Merrick Dixon
(74) *Attorney, Agent, or Firm*—Sughrue Mion, PLLC

(57) ABSTRACT

A skin material which can be precisely and easily bonded to a cushion main body while preventing the working atmosphere from becoming worse due to solvent volatilization; a skinned cushion excellent in air permeability and cushioning properties in the seating area; and a process for producing the skinned cushion are described. The skin material comprises an air-permeable sheet and an adhesive layer formed on the back side of the sheet by applying a melt of a hot-melt adhesive in such a manner as to form scattering dots of the melt or to leave scattering uncoated dot areas and hardening the melt.

11 Claims, 4 Drawing Sheets

SKIN MATERIAL, SKINNED CUSHION, AND PROCESS FOR PRODUCING SKINNED CUSHION

FIELD OF THE INVENTION

The present invention relates to a skin material, a skinned cushion, and a process for producing the skinned cushion.

BACKGROUND OF THE INVENTION

Among the cushions for use in automotive seats and the like are skinned cushions such as that shown in FIG. 12. This skinned cushion 60 comprises a cushion main body 55 formed by foam molding in a mold so as to have a given shape and a skin material 50 bonded to a surface of the cushion main body 55 in a later step. Frequently used as this skin material 50 are sheet materials having a three-layer structure formed by bonding a flexible polyurethane foam to the back side of a fabric, plastic sheet, or the like and bonding a tricot, nonwoven fabric, or the like as a backing fabric to the back side of the flexible polyurethane foam for the purposes of imparting to the skin material improved slip properties required for sewing and of improving the strength and other properties of the skin material which are required during use.

However, the conventional skinned cushion 60 has the following drawback. The skin material 50 covering a surface of the cushion main body 55 is bonded thereto throughout the whole surface. Because of this, even when the skin material 50 used is air-permeable, the spaces among the weaving or knitting yarns in the skin material 50 or the breathing holes in the skin material 50 are clogged with the adhesive 57 and this impairs the air permeability of the surface of the cushion 60. As a result, the person sitting on the cushion 60 feels uncomfortable because the buttocks in contact with the surface of the cushion 60 become moist. This cushion 60 further has a drawback that since the surface pores of the cushion main body 55 are clogged by the complete bonding of the skin material 50 to the cushion main body 55, cushioning properties are impaired.

Furthermore, production of the skinned cushion 60 has the following drawback. In the production thereof, a solvent-based adhesive 57 is applied by spraying on a surface of a cushion main body 55, and a skin material 50 is superposed on the coated surface of the cushion main body 55 in preparation for press molding. However, once the skin material 50 comes into contact with the coated surface of the cushion main body 55, it is difficult to shift the skin material 50 thereon because the surface coated with the solvent-based adhesive 57 has become tacky. Namely, precise positioning of the skin material 50 on the cushion main body 55 is extremely difficult. There is hence a problem that not only great care should be taken in bonding the skin material 50, making this operation difficult, but also bonding failures are apt to result. In addition, there is an environmental problem that solvent volatilization occurs during the adhesive application by spraying to impair the working atmosphere.

Moreover, there has been a problem that when the three-layer skin material is put on the cushion main body or when the cushion main body covered with the skin material is set in a mold for pressing, the skin material surface is apt to crease in curved areas such as corners to impair the appearance of the skinned cushion obtained.

Further, JP-A-6-182067 proposes a cushion material comprising a cushion pad part and a skin layer which is bonded and formed on the surface thereof through an adhesive layer, wherein the skin layer comprises an air-permeable surface layer for decoration, a flexible polyurethane foam sheet layer which arranged on the lower side of the air-permeable surface layer by bonding and a thermoplastic resin film layer which is arranged on the lower side of the flexible polyurethane foam sheet layer by bonding, numerous recesses are arranged at least on the contacting surface of the flexible polyurethane foam sheet layer with the thermoplastic resin film layer, and the surface other than the numerous recesses is covered with the thermoplastic resin film layer with the top of the recesses being opened, and wherein a moisture hardening type reactive hot melt adhesive is used to bond a skin material on the pad, and steam is supplied to the reactive adhesive through the air-permeable skin material to harden by activating the adhesive, by which the cushion material is provided which is somewhat improved in seating confortableness and is hard to allow the impairing of texture of the surface to some extent with resistance to possible wrinkling on a surface layer even when it is bent being placed inside. (The term "JP-A" as used herein means an "unexamined published Japanese patent application")

JP-A-7-195600 proposes a sheet material which is characterized in that a vinyl resin is adhered on at least one side surface of a foamed polyurethane sheet in such a manner as to form scattering dots of the vinyl resin, by which the manufactured sheet material is provided which is improved in sliding properties required at the time of manufacturing a skin material such as a sheet for a vehicle to some extent, and accordingly can be stitched and sewed on a sewing machine and does not generate few crease.

SUMMARY OF THE INVENTION

The invention has been achieved in view of the problems described above. An object of the invention is to provide a skin material which gives a skinned cushion having excellent air permeability and excellent cushioning properties in the seating area and can be precisely and easily bonded to a cushion main body while preventing the working atmosphere from becoming worse due to solvent volatilization, and which is less apt to crease in curved areas. Another object of the invention is to provide a skinned cushion. Still another object of the invention is to provide a process for producing the skinned cushion.

The invention provides a skin material which comprises an air-permeable sheet and an adhesive layer formed on the back side of the sheet by applying a melt of a hot-melt adhesive in such a manner as to form scattering dots of the melt or to leave scattering uncoated dot areas and hardening the melt.

The invention further provides a skinned cushion produced by bonding a skin material comprising an air-permeable sheet constituting the front side surface of the skin material to a surface of a cushion main body through an adhesive layer formed on the back side of the skin material, wherein the adhesive layer is constituted of a hot-melt adhesive interposed between the air-permeable sheet and the cushion main body so as to form scattering dots of the adhesive or to leave scattering uncoated dot areas.

The invention furthermore provides a process for producing a skinned cushion comprising a cushion main body and a skin material bonded to a surface thereof, which comprises: applying a melt of a hot-melt adhesive on the back side of an air-permeable sheet in such a manner as to form scattering dots of the melt or to leave scattering uncoated dot areas and hardening the melt to form a skin material comprising the air-permeable sheet having an adhesive layer on the back side thereof; and superposing the skin material on a surface of a cushion main body so that the adhesive layer faces inside and hot-pressing the skin material against the cushion main body to activate the hot-melt adhesive of the adhesive layer and thereby bond the skin material to the surface of the cushion main body while leaving unbonded areas between the skin material and the cushion main body.

DESCRIPTION OF REFERENCE NUMERALS AND SIGNS

Figure 1:
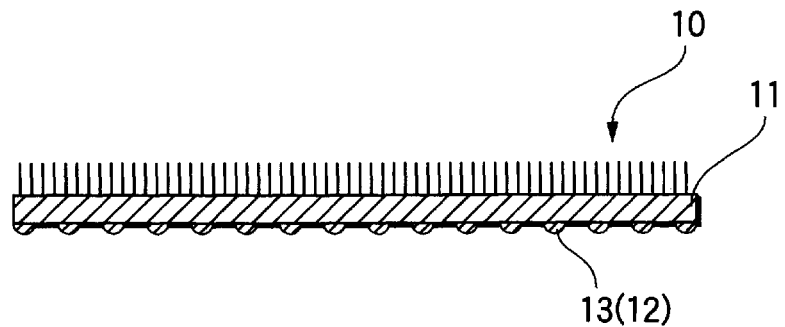
FIG. 1 is an enlarged sectional view illustrating one embodiment of the skin material according to the invention.

10, 10A, 10B: skin material
11, 11A, 11B: air-permeable sheet
111: outer layer
112: flexible polyurethane foam layer
12, 12A, 12B: adhesive layer
13, 13a, 13B: hot-melt adhesive
14A, 14B: uncoated area
15: cushion main body

DETAILED DESCRIPTION OF THE INVENTION

The invention will be explained below in detail by reference to accompanying drawings.

Figure 2:
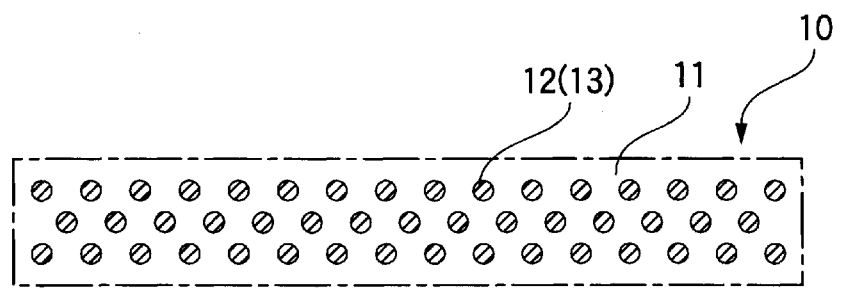
FIG. 2 is a view illustrating part of the back side of the skin material shown in FIG. 1.
Figure 5:
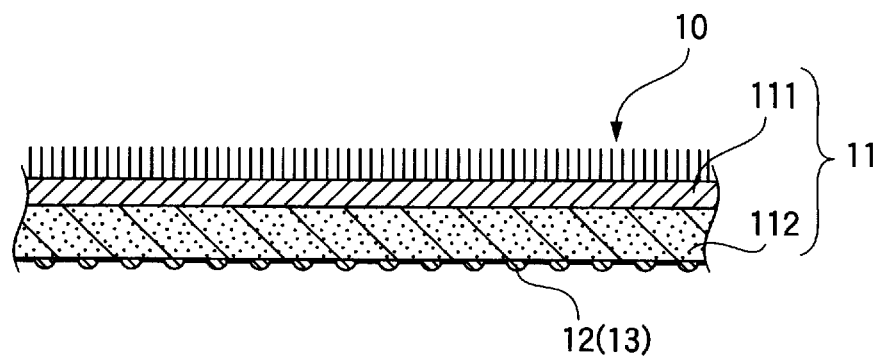
FIG. 5 is an enlarged sectional view illustrating another embodiment of the skin material according to the invention.

One embodiment of the skin material of the invention is shown in the enlarged sectional view of FIG. 1 and the back view of FIG. 2. This skin material 10 is composed of an air-permeable sheet 11 and an adhesive layer 12 formed on the back side thereof. The air-permeable sheet 11 may be made of an appropriate material having air permeability. Although this sheet may be a single-layer or multilayer sheet, it is especially preferably made of a stretchable material. Examples of this air-permeable sheet 11 include fibrous sheets such as knit fabrics (having short piles) formed from natural or synthetic fibers, wool woven fabrics such as moquettes (having long piles), woven fabrics such as plain weave fabrics, nonwoven fabrics, and felts, natural leathers, and sheets formed by superposing on any of these materials a layer of a flexible open-cell polyurethane foam having satisfactory air permeability. In FIG. 5 is shown an example of the air-permeable sheet 11 having a two-layer structure. This sheet 11 is composed of an air-permeable outer layer 111 consisting of a knit fabric or wool woven fabric and a flexible polyurethane foam layer 112 having satisfactory air permeability.

Figure 3:
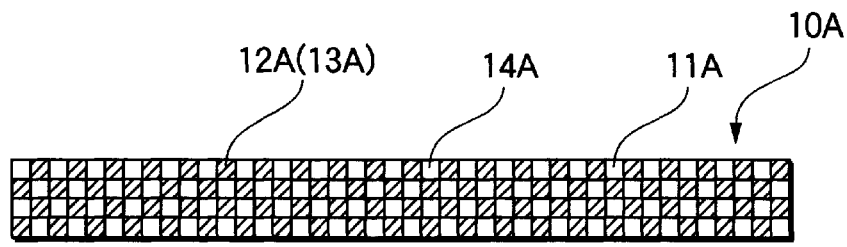
FIG. 3 is a partial view of a skin material back side wherein the adhesive layer has another pattern.
Figure 4:
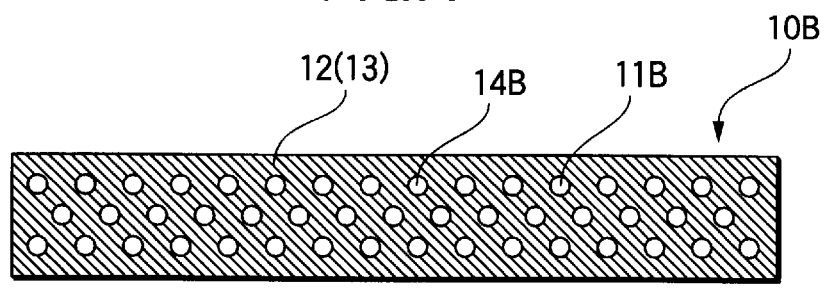
FIG. 4 is a partial view of a skin material back side wherein the adhesive layer has still another pattern.

The adhesive layer 12 may be one formed by melting a hot-melt adhesive 13 and applying the melt on the back side of the air-permeable sheet 11 in such a manner as to form scattering dots of the melt as in the example shown in FIG. 2 and hardening the melt. Other examples of the adhesive layer are shown in FIGS. 3 and 4 as adhesive layers 12A and 12B, respectively. The adhesive layer 12A or 12B deposited respectively on the back side of a skin material 10A or 10B is formed by applying a hot-melt adhesive 13A or 13B in such a manner as to leave scattering uncoated dot areas 14A or 14B and hardening the adhesive. Signs 11A and 11B each denotes an air-permeable sheet.

The adhesive layer 12 is preferably formed so that the uncoated areas account for from 30 to 90% of the whole back side of the air-permeable sheet 11, from the standpoints of bonding this skin material 10 to a cushion main body, which will be described later, without fail and of securing satisfactory air permeability and satisfactory cushioning properties. If the proportion of the uncoated areas exceeds 90%, the skin material tends to slide or peel off to impair reliable adhesion to the cushion main body. In case where the skin material is a fibrous sheet, such too high proportions of the uncoated areas are apt to result in fraying. Conversely, if the proportion thereof is lower than 30%, it is difficult to shift the skin material in positioning prior to the bonding of the skin material to a cushion main body. Furthermore, air permeability is impaired, so that the person sitting on the resultant cushion is apt to feel uncomfortable because the body parts in contact with the cushion become moist. The amount of an adhesive to be applied is preferably in the range of from 5 to 40 g/m$^2$. In the case where a hot-melt adhesive 13 is applied so as to form scattering dots thereof as shown in FIG. 2, these dots each preferably has a nearly circular form having a diameter of about from 1 to 5 mm or a nearly square form having a side length of about from 1 to 5 mm, and the dot-to-dot distance is preferably about from 0.5 to 4 mm. In the case where a hot-melt adhesive is applied so as to form a continuous adhesive layer and to leave scattering uncoated dot areas as shown in FIG. 4, the scattering uncoated dot areas each preferably has a nearly circular form having a diameter of about from 1 to 5 mm or a nearly square form having a side length of about from 1 to 5 mm and the distance therebetween is preferably about from 0.5 to 4 mm.

In the case where the air-permeable sheet 11 is composed of two layers consisting of an outer layer 111, e.g., a knit fabric, and a flexible polyurethane foam layer 112 as shown in FIG. 5, the formation of the adhesive layer 12, 12A, or 12B, in place of a conventional backing fabric, on the back side of the flexible polyurethane foam layer 112 is effective in enabling the skin material 10 to have better stretchability than the conventional three-layer skin material. Consequently, when this skin material 10 is put on a cushion main body or when the cushion main body covered with this skin material 10 is set in a mold for pressing and uniting the two members, the skin material is less apt to crease in curved areas, thereby giving a skinned cushion having a satisfactory appearance.

The hot-melt adhesive 13 is an adhesive which is solid at ordinary temperature and melts upon heating to a high temperature. This kind of adhesive is used in such a manner that the adhesive in the molten state is applied to an adherend and, before the melt cools and solidifies, this adherend is rapidly pressed against another adherend to bond the adherends together. Adhesives of this kind are roughly divided into two groups: general hot-melt adhesives comprising a thermoplastic resin which is solid at ordinary temperature; and thermally activable hot-melt adhesives (reactive hot-melt adhesives) which are reactivated (come to have adhesive properties, e.g., through activation of reactive groups by thermal dissociation) when reheated after cooling and hardening. A suitable one is employed. Examples thereof include a synthetic rubber adhesive and polyamide adhesive, respectively available under the trade names of HR-9608 and HR-9380 (all manufactured by Hitachi Kasei Polymer Co., Ltd.). When the adhesive 13 is made of the same material as the cushion main body, it is easy to recycle the skinned cushion. For example, in the case where the cushion main body is a polyurethane foam, the hot-melt adhesive 13 is more preferably a urethane adhesive (thermoplastic or moisture-curable type).

When the air-permeable sheet is made of a flexible polyurethane foam excellent in air-permeability, because it is hard to be slipped and shifted in the positioning as compared with a fibrous sheet, the use of the thermally activable hot-melt adhesives (reactive hot-melt adhesives) is more preferred than the use of the general hot-melt adhesives in order to exhibit good performance.

Further, even in case of using any air-permeable sheet, the hot-melt adhesives comprising vinyl-based resins are not preferred because there is a danger of generating dioxine when a skin material is recycled or incinerated as a scrapped material.

The hardened hot-melt adhesive 13 is not tacky. Consequently, when this skin material 10 is put on a cushion main body and positioned, it can be shifted on the surface of the cushion main body and precise positioning is possible. The skin material 10 can be easily handled in other cases, e.g., storage and transportation, because the back side of the skin material 10 does not stick to other substances, etc. Furthermore, in the case where the air-permeable sheet 11 is a fibrous sheet, e.g., a nonwoven fabric, the adhesive layer 12 serves to prevent fraying and does not impair the air permeability and stretchability of the skin material. Although there has been a technique for fraying prevention which comprises applying an acrylic or another emulsion to the back side of the fibrous sheet, this technique for fraying prevention not only impairs the air permeability and stretchability of the fibrous sheet but has the following drawback. Before a skin material comprising this fibrous sheet is put on a surface of a cushion main body and united therewith through bonding, it is necessary to apply an adhesive again to the back side of the skin material or to the surface of the cushion main body. Namely, there is a trouble that application of an adhesive should be conducted twice in total.

Figure 6:
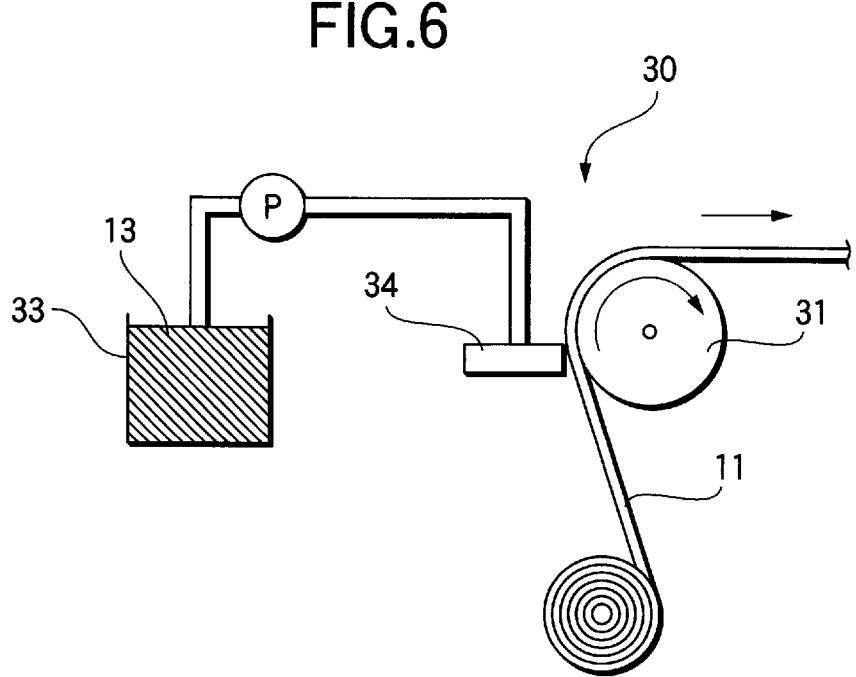
FIG. 6 is a diagrammatic view illustrating an apparatus for applying an adhesive.

A simple technique for forming the adhesive layer 12 is to apply an adhesive by a slide coater method 30 such as that shown in FIG. 6. In this method, a hot-melt adhesive 13 is melted in a melter 33, and the melt is sent to a T-die 34 with a pump P. On the other hand, an air-permeable sheet 11 is continuously run at a given speed in one direction with a revolving roll 31. The T-die is located so as to face the back side of the air-permeable sheet 11 and to make a gap therebetween (to be apart therefrom). The molten hot-melt adhesive is applied to the back side of the air-permeable sheet 11 through the front end of the T-die 34. The coated air-permeable sheet 11 is sent forward to cool and harden the hot-melt adhesive deposited on the back side of the air-permeable sheet 11 to thereby form the adhesive layer 12. According to this slide coater method, the hot-melt adhesive 13 can be applied so as to form a desired adhesive layer pattern by changing the running speed of the air-permeable sheet 11, the rate of discharge from the T-die 34, and the distance (gap) between the front end of the T-die 34 and the back side surface of the air-permeable sheet 11. For example, when the speed of the revolving roll 31 is high, the application amount of the hot-melt adhesive 13 is small, and the gap is large, then the resultant layer of the hot-melt adhesive 13 has a large dot-to-dot distance. Namely, the adhesive is applied as scattering dots so as to leave a large proportion of uncoated areas. Conversely, when the speed of the revolving roll 31 is low, the application amount is large, and the gap is small, then the resultant layer of the hot-melt adhesive 13 has a small dot-to-dot distance and, as shown in FIGS. 3 and 4, has a small proportion of uncoated areas 14A or 14B.

The skin material 10 is shaped in the form of a bag suitably by sewing, etc. according to the shape of the cushion main body. In this case also, since the hot-melt adhesive 13 of the adhesive layer 12 deposited on the back side of the skin material 10 has been hardened and is not tacky, not only the adhesive neither impairs the workability of the skin material 10 in the sewing nor adversely influences the operation for attaching this skin material 10 to a cushion main body, but also the skin material 10 is less apt to crease.

Figure 7:
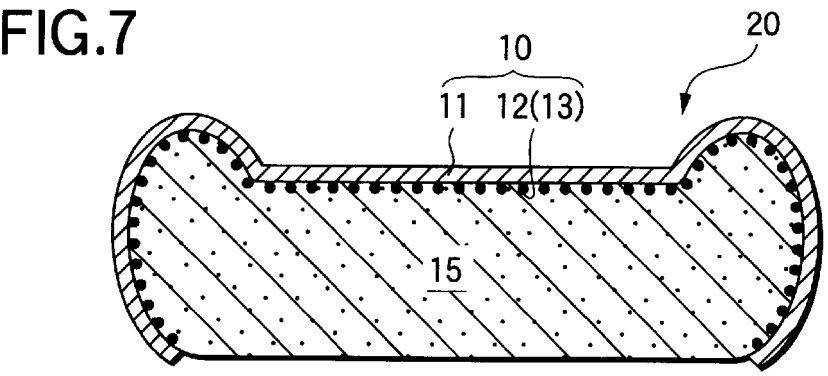
FIG. 7 is a sectional view of one embodiment of the skinned cushion according to the invention.

In FIG. 7 is shown a skinned cushion 20. This skinned cushion 20 is obtained by putting the skin material 10 on a surface of a cushion main body 15 and heating the hot-melt adhesive 13 of the adhesive layer 12 deposited on the back side of the skin material 10 to thereby reactivate the adhesive 13 and bond the skin material 10 to the surface of the cushion main body 15. The cushion main body 15, which is constituted of a polyurethane foam or the like, is one produced by a known foam molding technique so as to have a given shape by packing a foaming material into a mold (not shown) and foaming the foaming material.

In this skinned cushion 20, the hot-melt adhesive 13 constituting the adhesive layer 12 is interposed between the air-permeable sheet 11 of the skin material 10 and the cushion main body 15 so as to form scattering dots of the adhesive or to leave scattering uncoated dot areas. Consequently, the cushion main body 15 are interconnected to the outer surface of the skin material 10 through the areas where the hot-melt adhesive 13 is absent. Namely, air permeability through the surface of the skinned cushion 20 is secured and seat moistening in sitting is much reduced. This cushion 20 further has the following advantages. The cushion main body 15 is usually constituted of a flexible open-cell polyurethane foam so as to attain satisfactory cushioning properties and the pores present on the surface of the cushion main body 15 are open. Since not all the pores present on the surface of the cushion main body 15 are clogged with the hot-melt adhesive 13 in the invention, the cushion main body 15 is not inhibited from showing elastic deformation and can exhibit the cushioning properties inherent therein. Furthermore, in the case where the air-permeable sheet 11 of the skin material 10 has a two-layer structure composed of an outer layer 111 and a flexible polyurethane foam layer 112 as described above, the skin material 10 is less apt to crease in curved areas and gives a satisfactory appearance.

The process of the invention for producing a skinned cushion will be explained below by reference to the production of the skinned cushion 20 as an example. This process for producing the skinned cushion comprises a step for forming a skin material 10 by forming an adhesive layer 12 on the back side of the air-permeable sheet 11 (skin material formation) and a step for bonding the skin material 10 to a surface of a cushion main body 15 (skin material bonding).

In the step of skin material formation, an air-permeable sheet 11 is used which is constituted of one or more materials having air permeability and preferably further having stretchability. As explained with regard to an embodiment of the skin material 10 of the invention described above, this air-permeable sheet 11 may consist of a knit, moquette, or the like or consist of such a fabric and bonded thereto a flexible open-cell polyurethane foam. A melt of a thermally activable hot-melt adhesive 13 (e.g., synthetic rubber, polyamide, or polyurethane type) is applied to the back side of the air-permeable sheet 11 by the slide coater method illustrated in FIG. 6, so as to form scattering dots of the melt or to leave scattering uncoated dot areas. The melt applied is hardened to form the adhesive layer 12. After the adhesive layer 12 has been formed on the back side of the air-permeable sheet 11, the skin material 10 is formed into a desired bag shape according to need by sewing, etc. There is no need of successively conducting this step of skin material formation and the step of skin material bonding, which will be described below. Namely, a skin material formed beforehand according to this step of skin material formation may be subjected to the step of skin material bonding at an appropriate time.

Figure 8:
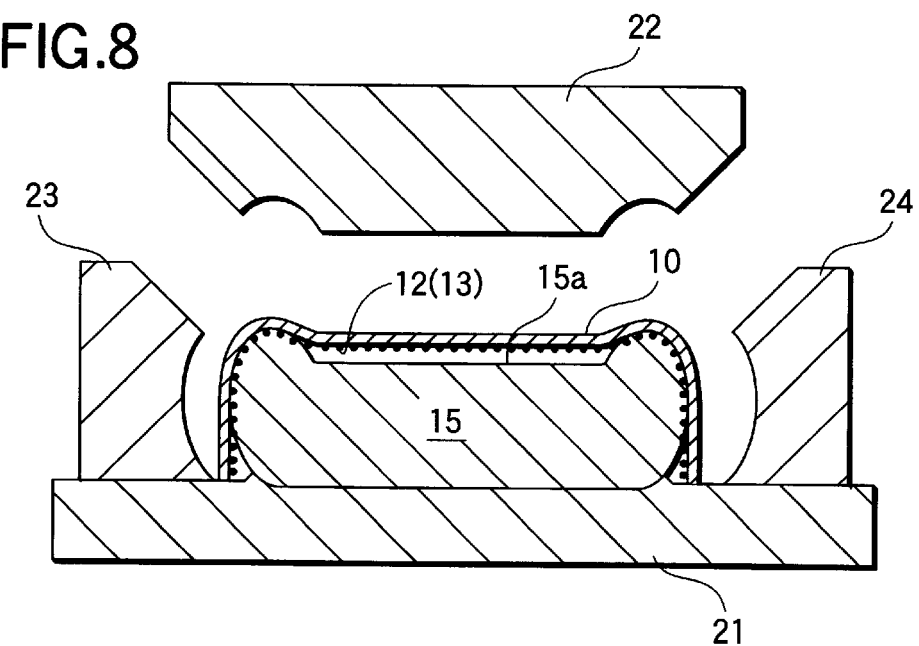
FIG. 8 is a sectional view of an apparatus for bonding a skin material to a cushion main body.

In the step of skin material bonding, a cushion main body 15 consisting of, e.g., a polyurethane foam is prepared first, which has been molded with a mold beforehand so as to have a desired form, e.g., a seat form, as shown in FIG. 8. This cushion main body 15 is placed on a lower support die 21 in such a manner that those areas 15a of the cushion main body 15 which are to be covered with the skin material (in this example, the sitting area and the side areas) face upward. The skin material 10 is put on those areas 15a of the cushion main body 15 which are to be covered therewith, in such a manner that the adhesive layer 12 faces inward, i.e., faces the cushion main body 15. The skin material 10 thus put is suitably shifted on the surface of the cushion main body 15 and precisely positioned. In this positioning, since the hot-melt adhesive 13 of the adhesive layer 12 deposited on the back side of the skin material 10 has been hardened and is not tacky, the skin material 10 is not inhibited from being shifted and has intact workability. Numeral 22 denotes an upper pressing die and 23 and 24 each denotes a side die.

Figure 9:
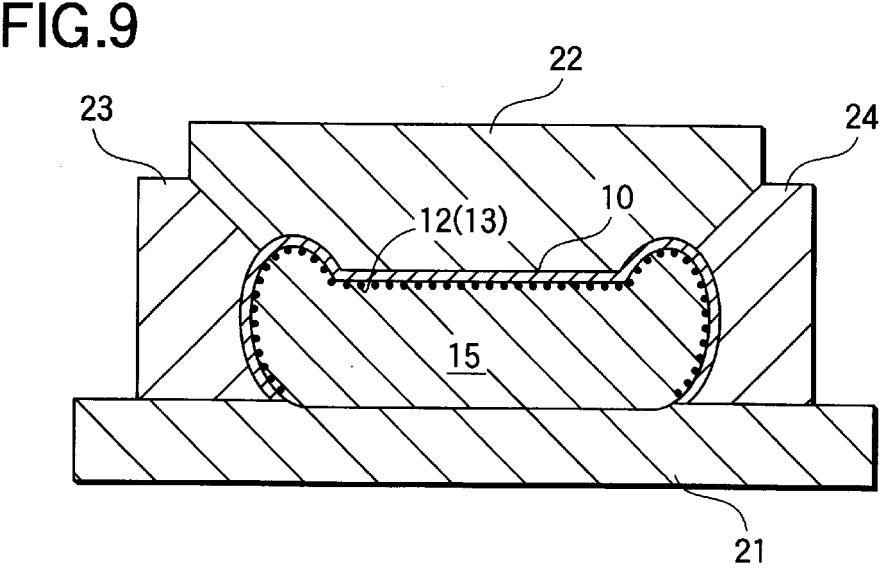
FIG. 9 is a sectional view illustrating the skin material being hot-pressed.

Subsequently, as shown in FIG. 9, the surface of the skin material 10 is hot-pressed with an upper pressing die 22 and side pressing dies 23 and 24; these dies 22, 23, and 24 have an inner surface conforming to the surface of the cushion main body 15. Thus, the adhesive layer 12 deposited on the back side of the skin material 10 is press-bonded to the surface of the cushion main body 15. In this press bonding, the upper pressing die 22 and the side pressing dies 23 and 24 are heated to a necessary temperature with a built-in heater or the like (not shown), whereby the hot-melt adhesive 13 of the adhesive layer 12 deposited on the back side of the skin material 10 is heated and reactivated to show adhesive properties. The temperature to which the upper pressing die 22 and the side pressing dies 23 and 24 are heated is a temperature at which the hot-melt adhesive 13 is reactivated. This temperature varies depending on the kind of the hot-melt adhesive 13. Although a suitable pressure is used for the hot pressing, an example thereof is 0.1 kg/cm$^2$.

Figure 10:
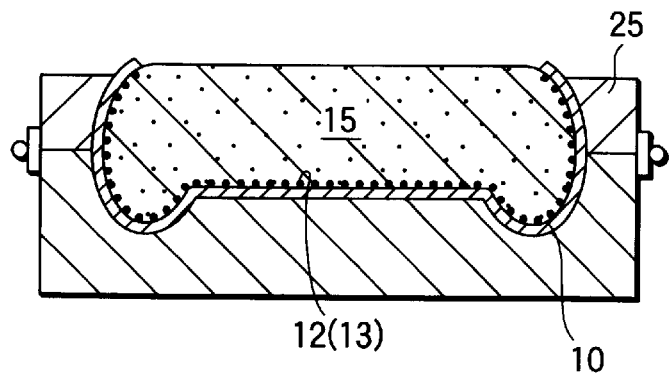
FIG. 10 is a sectional view illustrating a step in which the skinned cushion being produced is cooled while retaining its shape.

The skin material 10 is thus heated and pressed for a necessary period against the surface of the cushion main body 15 with the upper pressing die 22 and the side pressing dies 23 and 24. Thereafter, the upper pressing die 22 and the side pressing dies 23 and 24 are separated from the skin material 10, and a molded article consisting of the cushion main body 15 and the skin material 10 bonded to the surface thereof is taken out. This molded article is transferred to a shape retention die 25 made of, e.g., wood, as shown in FIG. 10. The skin material 10 is allowed to cool while being kept in close contact with the surface of the cushion main body 15, whereby the hot-melt adhesive 13 of the adhesive layer 12 is hardened. Thereafter, the shape retention die 25 is opened and the molded article is taken out. Thus, a skinned cushion 20 shown in FIG. 7 is obtained which is excellent in air permeability and cushioning properties. The cooling in the shape retention die may be conducted for an appropriate period, an example of which is 50 seconds.

Figure 11:
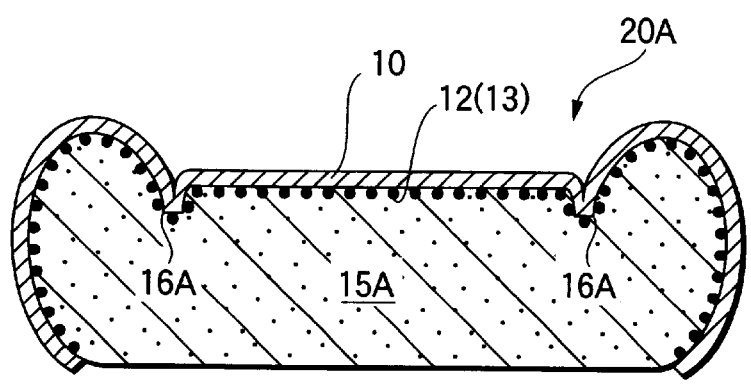
FIG. 11 is a sectional view of another embodiment of the skinned cushion according to the invention.
Figure 12:
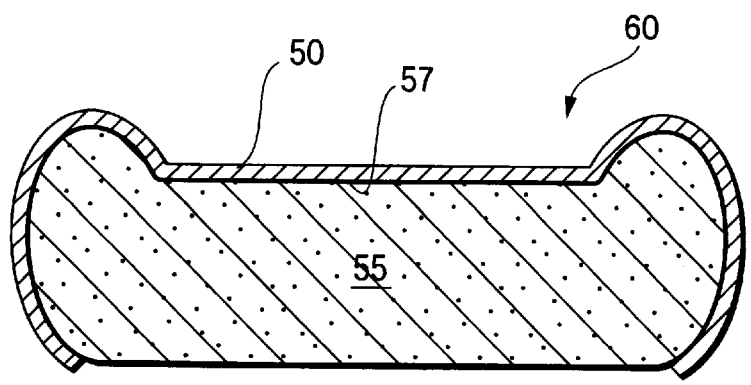
FIG. 12 is a sectional view of a conventional skinned cushion.

For producing a skinned cushion having a deeply drawn part 16A, e.g., a groove, on the surface of the cushion main body 15A, such as the skinned cushion 20A shown in FIG. 11, use may be made of a method in which the skin material 10 is put on the cushion main body in the step of skin material bonding so as to come into contact with the deeply drawn part 16A before the hot-pressing operation is conducted.

The invention will be explained below in more detail by reference to the following Examples, but the invention should not be construed as being limited thereto.

Skin materials in which the air-permeable sheet 11 had a single-layer structure were produced in Examples according to the invention. Details of each skin material are shown in Table 1 with respect to the constitution of the skin material, production conditions therefor, and the air permeability and tear strength thereof. The air permeability and tear strength were measured in accordance with JIS-L-1096-1990 and JIS-L-1041-1983, respectively. For the purpose of comparison, skin materials of Comparative Examples are also shown in Table 1.

TABLE 1

| | | Kind of | Method of application | | Conditions for | Air | Tear |
|---|---|---|---|---|---|---|---|
| | | Skin material | hot-melt adhesive | Amount (g/m²) | Pattern | reactivation (° C. × sec) | permeability (cc/cm²/sec) | strength (kg) |
| Example | 1 | moquette | synthetic rubber[1] | 40 | FIG. 2 | 80 × 50 | 113 | 16.3 |
| | 2 | moquette | polyamide[2] | 30 | FIG. 2 | 120 × 60 | 128 | 17.8 |
| | 3 | moquette | polyamide[2] | 30 | FIG. 4 | 120 × 60 | 102 | 17.1 |
| | 4 | knit | synthetic rubber[1] | 20 | FIG. 2 | 80 × 50 | 140 | 3.5 |
| Comparative Example | 1 | moquette | hot-melt film laminating | EVA film, 40 μm | application to whole surface | 100 × 50 | 0 | 25.3 |
| | 2 | moquette | reactive hot-melt adhesive[4] | 40 | spraying over whole surface | 80 × 60 | 10 | 18.9 |
| | 3 | knit | solvent-based rubber adhesive[5] | 30 | spraying over whole surface | room temp. × 30 | 45 | 4.6 |
| | 4 | moquette | synthetic rubber[1] | 70 | application to whole surface | 80 × 50 | 30 | 19.3 |
| | 5 | knit | EVA[3] | 4 | FIG. 2 | 100 × 40 | 177 | 2.9 |
| Reference Example | 1 | moquette | none | | | | 158 | 14.0 |
| | 2 | knit | none | | | | 192 | 2.9 |

1) Thermoplastic rubber (TPR) hot-melt adhesive Trade name: HR-9608 (manufactured by Hitachi Kasei Polymer)
2) Polyamide resin hot-melt adhesive Trade name: HR-9380 (manufactured by Hitachi Kasei Polymer)
3) EVA copolymer resin hot-melt adhesive Trade name: HR-9880L (manufactured by Hitachi Kasei Polymer)
4) Reactive urethane prepolymer adhesive Trade name: R-HM4812 (manufactured by Hitachi Kasei Polymer)
5) Solvent-based (toluene/n-hexane) chloroprene rubber adhesive Trade name: 1432SG (manufactured by Hitachi Kasei Polymer)

In each of Examples 1 to 4, a hot-melt adhesive was melted and applied by the slide coater method on the back side of an air-permeable sheet so as to form scattering dots of the melt or to leave scattering uncoated dot areas. The amounts of these adhesives applied were from 5 to 40 g/m². The proportion of the uncoated areas to the whole back side surface of the air-permeable sheet was roughly in the range of from 30 to 90%. It can be seen from Table 1 that each of these skin materials had satisfactory air permeability almost the same as that of the air-permeable sheet, and that the adhesive layer improved the tear strength of the air-permeable sheet.

In Examples 2 and 3, the same hot-melt adhesive was applied in the same amount. However, these Examples differed only in the distance (gap) between the front end of the T-die 34 and the back side surface of the air-permeable sheet 11. As a result, the resultant adhesive layers had different patterns although the application amount was the same. These two skin materials slightly differed in air permeability. However, the air permeability of each skin material was suitable for cushion materials.

In Comparative Example 1, a hot-melt film was laminated to the back side of an air-permeable sheet. In Comparative Examples 2 and 3, an adhesive was applied to the back side of an air-permeable sheet. In Comparative Examples 4 and 5, a hot-melt adhesive was applied by the same slide coater method as in the Examples. In Comparative Example 4, however, since the application amount was too large, the skin material had a reduced air permeability. In Comparative Example 5, since the application amount was too small, the skin material had a reduced tear strength and was apt to suffer fraying and bonding failures. Namely, the skin material of Comparative Example 5 had poor durability and was unsuitable for use in seats.

Furthermore, skin materials in which the air-permeable sheet 11 had a two-layer structure consisting of an outer layer 111 and a flexible polyurethane foam layer 112 as shown in FIG. 5 were produced in Examples 5 and 6. These skin materials were examined for back side slip properties, air permeability, and creasing in curved areas, and the results obtained are shown in Table 2. The hot-melt adhesives used are as shown in Table 1. The slip properties were evaluated in terms of static frictional force in accordance with JIS-K-7125-1987, and the air permeability was evaluated in accordance with JIS-L-1096-1990. The creasing was judged in terms of the largest radius of curvature at which creasing occurred when the skin material was put on curved surfaces having different radii of curvature. Furthermore, in Comparative Example 6, a skin material which had a backing fabric bonded thereto in place of the adhesive layer of the Examples was examined in the same manner. In the air-permeable sheet, the outer layer 111 was a knit and the flexible polyurethane foam layer 112 was a polyether polyurethane foam having a thickness of 8 mm and a density of 20 kg/m³; the outer layer 111 and the flexible polyurethane foam layer 112 had been bonded to each other by flame laminating. With respect to the adhesive layers in Examples 5 and 6, the proportion of the uncoated areas to the whole back side surface of the air-permeable sheet was roughly in the range of from 30 to 90%.

TABLE 2

| | | Kind | | Method of application | | Static frictional force (N) | | Air permeability (cc/cm²/sec) | Radius of curvature for creasing (mm) |
|---|---|---|---|---|---|---|---|---|---|
| | | Backing fabric | hot-melt adhesive | Amount (g/m²) | Pattern | Machine direction | Transverse direction | | |
| Example | 5 | — | reactive[4] | 5 | FIG. 2 | 0.54 | 0.53 | 133 | 2 |
| ple | 6 | — | reactive[4] | 10 | FIG. 4 | 0.45 | 0.45 | 132 | 3 |
| Comparative Example | 6 | 15-d tricot | reactive[4] | 40 | whole surface | 0.64 | 0.59 | 120 | 10 |

The results given in Table 2 show that as compared with the skin material of Comparative Example 6, the skin materials of Examples 5 and 6 had smaller values of static frictional force, better back side slip properties, and higher air permeabilities. Furthermore, the skin materials of Examples 5 and 6 had smaller radii of curvature for creasing. Namely, they were less apt to crease in curved areas.

As illustrated in drawings and described above, the skin material, skinned cushion, and process for skinned-cushion production of the invention bring about the following effects. Since the hot-melt adhesive which bonds the skin material to the cushion main body is interposed between the air-permeable sheet constituting the skin material and the cushion main body so as to form scattering dots of the adhesive or to leave scattering uncoated dot areas, not only air can pass through those parts of the skin material where the hot-melt adhesive is absent and through inner parts of the cushion main body to attain excellent air permeability with no moistening, but also intact stretchability and satisfactory cushioning properties can be obtained. The adhesive layer is also effective in preventing the skin material from suffering bonding failures or fraying.

Furthermore, according to the skin material of the invention and the process for skinned-cushion production of the invention, the following effects are produced besides the effects described above. In the positioning of the skin material in preparation for the bonding of the skin material to a cushion main body, the back side surface of the skin material does not stick to the surface of the cushion main body, so that the positioning can be conducted while shifting the skin material on the cushion main body. Consequently, there is no possibility of resulting in bonding failures or product failures caused by erroneous skin material positioning or the like. In addition, since the operation for boding the skin material is not accompanied by solvent volatilization, the working atmosphere is not impaired. The skin material is less apt to crease in curved areas and imparts a satisfactory appearance to the skinned cushion.

To sum up, according to the invention, the application of a hot-melt adhesive to a fibrous sheet so as to form scattering dots of the adhesive or to leave scattering uncoated dot areas can be accurately and precisely performed by adopting the coating method by means of the slide coater method. Further, a fibrous sheet can be controlled with respect to properties including air permeability and susceptibility to bonding failures or fraying and can be prevented from creasing in curved areas by regulating the application amount thereof. Thus, a skin material and a skinned cushion each having excellent properties and a process for producing the cushion can be provided.

While the invention has been described in detail and with reference to specific embodiments thereof, it will be apparent to one skilled in the art that various changes and modifications can be made therein without departing from the spirit and scope thereof.

What is claimed is:

1. A process for producing a skinned cushion comprising a cushion main body and a skin material bonded to a surface thereof, said process comprising:

applying a melt of a hot-melt adhesive on the back side of an air-permeable sheet in such a manner as to form an ordered pattern of dots of the melt or to leave an ordered pattern of uncoated dot areas and hardening the melt to form a skin material comprising the air-permeable sheet having an adhesive layer on the back side thereof; and superposing the skin material on a surface of a cushion main body so that the adhesive layer faces inside and hot-pressing the skin material against the cushion main body to activate the hot-melt adhesive of the adhesive layer and thereby bond the skin material to the surface of the cushion main body while leaving unbonded areas between the skin material and the cushion main body, wherein said skin material has an air permeability of from 100 to 155 cc/cm²/sec and a static coefficient of friction of 0.3 or less.

2. The skin material according to claim 1, wherein the amount of said hot-melt adhesive applied is in the range of from 5 to 40 g/m².

3. The skin material according to claim 1, wherein said ordered pattern of uncoated dot areas account for from 30 to 90% of the whole back side of the air-permeable sheet.

4. The skin material according to claim 1, wherein said ordered pattern of uncoated dot areas each has a circular form having a diameter of from 1 to 5 mm and the distance therebetween is from 0.5 to 4 mm.

5. The skin material according to claim 1, wherein said ordered pattern of uncoated dot areas each has a square form having a side length of from 1 to 5 mm and the distance therebetween is from 0.5 to 4 mm.

6. The skin material according to claim 5, wherein said hot-melt adhesive is selected from the group consisting of a synthetic rubber, a polyamide resin and a polyurethane resin.

7. A skin material which comprises a laminate of a first layer selected from the group consisting of a fabric, a felt, and a leather, and a second layer which is an air-permeable sheet comprising a flexible, open-cell polyurethane foam, wherein a hot-melt adhesive is applied on the backside surface of the air-permeable sheet on which surface the first layer has not been adhered in such a manner as to arrange an ordered pattern of dots of the adhesive or to leave an ordered pattern of uncoated dot areas, and the skin material has an air permeability of from 100 to 155 cc/cm²/sec and a static coefficient of friction of 0.3 or less.

8. A skinned cushion which comprises a laminate of a skin material having an air permeability of from 100 to 155 cc/cm$^2$/sec and a static coefficient of friction of 0.3 or less, an adhesive and a cushion material, said adhesive being a hot-melt adhesive and being interposed between the skin material and the cushion material in such a manner as to arrange an ordered pattern of dots of the adhesive.

9. A skinned cushion which comprises a laminate of a skin material having an air permeability of from 100 to 155 cc/cm$^2$/sec and a static coefficient of friction of 0.3 or less, an adhesive and a cushion material, said adhesive being a hot-melt adhesive and being interposed between the skin material and the cushion material in such a manner as to leave an ordered pattern of uncoated dot areas.

10. A skin material comprising (a) an air-permeable sheet having a front side and a back side and (b) an ordered pattern of dots of a hot-melt adhesive on the back side of the air-permeable sheet, said skin material having an air permeability of from 100 to 155 cc/cm$^2$/sec and a static coefficient of friction of 0.3 or less, and being the product of steps comprising:

providing an air-permeable sheet having an air permeability of from 100 to 155 cc/cm$^2$/sec and a static coefficient of friction of 0.3 or less, providing a hot-melt adhesive, melting the hot-melt adhesive, applying the hot-melt adhesive on the back side of the air-permeable sheet with a slide coater in such manner as to form an ordered pattern of dots of the hot-melt adhesive on the sheet, and hardening the adhesive.

11. A skin material comprising (a) an air-permeable sheet having a front side and a back side and (b) an ordered pattern of a hot-melt adhesive and uncoated dot areas on the back side of the air-permeable sheet, said skin material having an air permeability of from 100 to 155 cc/cm$^2$/sec and a static coefficient of friction of 0.3 or less, and being the product of steps comprising:

providing an air-preamble sheet having an air permeability of from 100 to 155 cc/cm$^2$/sec and a static coefficient of friction of 0.3 or less, providing a hot-melt adhesive, melting the hot-melt adhesive, applying the hot-melt adhesive on the back side of the air-preamble with a slide coater in such a manner as to form an ordered pattern of hot-melt adhesive and uncoated dot areas on the sheet, and hardening the adhesive.

* * * * *